United States Patent [19]

Numata

[11] 4,225,218
[45] Sep. 30, 1980

[54] EXPOSURE TIME CONTROL CIRCUIT FOR CAMERA WITH FLASH LIGHT DEVICE

[75] Inventor: Saburo Numata, Urawa, Japan
[73] Assignee: Fuji Photo Optical Co., Ltd., Japan
[21] Appl. No.: 3,040
[22] Filed: Jan. 12, 1979
[51] Int. Cl.$^3$ .................... G03B 15/05; G03B 7/00
[52] U.S. Cl. .................... 354/23 D; 354/50; 354/149
[58] Field of Search ............ 354/23 D, 33, 50, 60 F, 354/139, 149

[56] References Cited

U.S. PATENT DOCUMENTS

| | | | |
|---|---|---|---|
| 4,083,059 | 4/1978 | Tsunekawa et al. | 354/60 F |
| 4,091,396 | 5/1978 | Sahara et al. | 354/60 F |
| 4,096,492 | 6/1978 | Land et al. | 354/60 F |

*Primary Examiner*—L. T. Hix
*Assistant Examiner*—W. J. Brady

*Attorney, Agent, or Firm*—Pasquale A. Razzano; Harold L. Stults

[57] ABSTRACT

In a camera provided with an electronic flash light device, the exposure time is controlled based on a manually selected condition when so required in case that the flash light device is not ready for emitting light. A light measuring circuit is connected with an exposure time signal generating circuit which is connected with a shutter speed control circuitry. In parallel with the light measuring circuit a manually operable exposure time selecting circuit is connected so that selection can be made between the automatic exposure control based on the output of the light measuring circuit and the manual exposure control based on the output of the manually operable exposure time selecting circuit. When the electronic flash light device is ready for emitting light with sufficient level of charge in the main capacitor of the flash light device, the exposure time is controlled based on a predetermined condition desirable for flash light photography.

5 Claims, 1 Drawing Figure

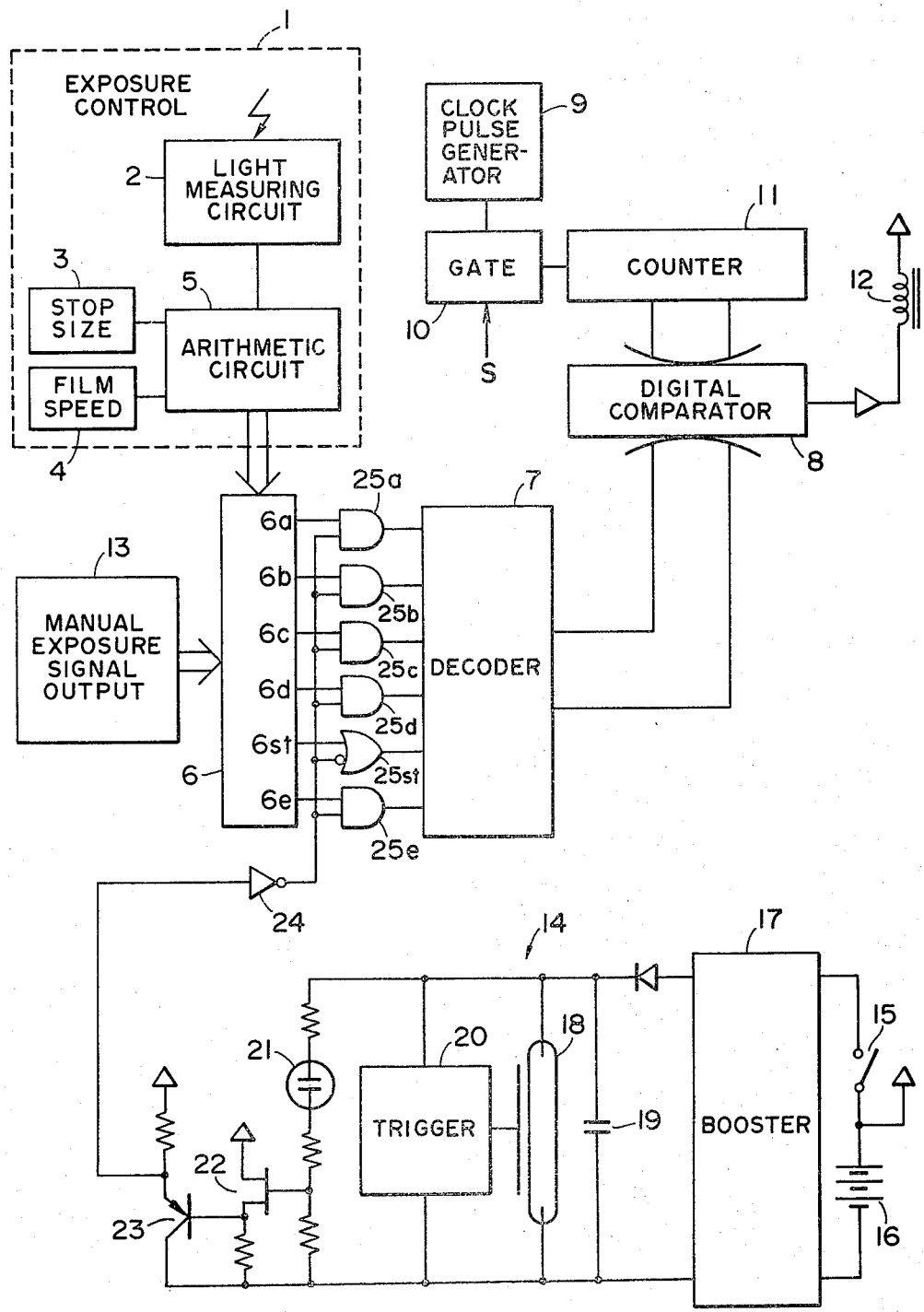

EXPOSURE TIME CONTROL CIRCUIT FOR CAMERA WITH FLASH LIGHT DEVICE

BACKGROUND OF THE INVENTION

1. Field of the Invention

This invention relates to an exposure control means for use in a photographic camera provided with a built-in electronic flash light device, and more particularly to an exposure time control circuit for use in a camera provided with an electronic-flash light device in which the exposure time is controlled in accordance with the scene brightness when the electronic flash light device is not ready for emitting flash light and in accordance with the condition determined for the flash light photography when the electronic flash light device is ready for emitting light.

2. Description of the Prior Art

It has been known in the art to control the exposure time in a camera provided with an electronic flash light device in accordance with the scene brightness when the electronic flash light device is not ready for emitting light and control the same in accordance with the predetermined condition for the flash light photography when the electronic flash light device is ready for emitting flash light. In more detail, as disclosed for instance in U.S. Pat. No. 4,016,575, it has been known in the art to make change-over between an automatic daylight exposure range and an automatic flash exposure range.

However, in the above-described prior art, it has been impossible to manually control the exposure time in addition to the above function of automatic exposure control.

SUMMARY OF THE INVENTION

It is the primary object of the present invention to provide an exposure control means for use in a camera in which the exposure time can be controlled manually and automatically not only for daylight exposure range but also for flash exposure range.

A more specific object of the present invention is to provide an exposure time control circuit for use in a camera provided with a built-in electronic flash light device in which the exposure time is controlled in accordance with the scene brightness when the electronic flash light is not ready for emitting light and in accordance with the predetermined condition for the flash light photography when the electronic flash light is ready for emitting light, and further in accordance with manually selected conditions when so required.

The above objects of the present invention are accomplished by providing a manual exposure time setting means in an exposure time control circuit including a changeover means to make change-over between automatic daylight exposure and automatic flash exposure. In more detail, the exposure control circuit in accordance with the present invention comprises a light measuring circuit for measuring the scene brightness and giving an output corresponding to the scene brightness, an exposure signal generating circuit for generating an output signal indicative of the exposure time corresponding to the scene brightness based on the output of the light measuring circuit and other exposure information such as film sensitivity and the size of the stop, and a comparator which compares the output signal from the exposure signal generating circuit with a standard signal to automatically control the exposure time, wherein the improvement comprises a manually operable exposure time input means for providing the exposure signal generating circuit with a manual exposure signal output so that the exposure signal generating circuit may generate an exposure control output signal based on a manually selected condition, and a control circuit connected with said comparator for giving an output to the comparator which is based on a predetermined condition for flash photography only when the control circuit receives a flash light emission ready signal.

In accordance with the present invention, the exposure time is controlled according to the manually selected condition when required and according to the scene brightness when the electronic flash light device attached to the camera is not in a ready condition. When the electronic flash light device becomes ready for emitting light, the exposure is controlled according to the predetermined condition for flash light photography.

BRIEF DESCRIPTION OF THE DRAWING

The single Figure is a block diagram showing the electric circuitry of the exposure control circuit in accordance with an embodiment of the present invention.

DESCRIPTION OF THE PREFERRED EMBODIMENT

Referring to the drawing, a light measuring circuit 2 and an arithmetic circuit 5 to which outputs from a stop size information input means 3 and a film speed information input means 4 are transmitted are contained in an automatic exposure control circuit 1. The output from the exposure control circuit 1 is given to an exposure time signal generating circuit 6 of binary code system. This exposure time signal generating circuit may comprise an analog-to-digital converter for providing a digital signal (such as a binary "1") at a selected output terminal 6a, 6b, ... 6st ... 6e thereof as a function of the level of the output received from the exposure control circuit. Alternatively, if the output received from exposure control circuit 1 is a digital signal (such as an n-bit signal), the exposure time signal generating circuit may comprise a 1-out-of-n decoder. The output from the exposure time signal generating circuit 6 is given to a decoder 7 of decimal code system. The decimal system output of the decoder 7 is given to one input of a digital comparator 8. On the other hand, a standard signal from a clock pulse generator 9 is input into a digital counter 11 by way of a gate circuit 10. The gate circuit 10 is opened by a synchronizing signal S given in response to start of a leading shutter blind of the camera thereby passing the standard signal therethrough to the digital counter 11 which counts a decimal signal. The output of the digital counter 11 is given to the other input of the digital comparator 8, where it is compared with the output of the output from the decoder 7. When the two outputs becomes equal, the digital comparator 8 generates an output to be given to a coil 12 which releases a trailing shutter blind locking means thereby to start the trailing shutter blind. Thus, the optimum exposure time is obtained.

In addition to the above described structure, in this invention a manually controlled exposure time input means 13 is connected with the exposure time signal generating circuit 6 so that an output manually selected can be input into the exposure time signal generating circuit 6 when so required. In the embodiment wherein the exposure time signal generating circuit comprises an analog-to-digital converter, the output of the manually controlled exposure time input means is an analog signal whose level represents the manually selected exposure time. In the embodiment wherein exposure time signal generating circuit 6 comprises a 1-out-of-n decoder, the output of manually controlled exposure time input means 13 is an n-bit digital signal. The output of the manually operable exposure time input means 13 and the output of the exposure control circuit 1 are selectively input into the exposure time signal generating circuit 6. Therefore, the input into the comparator 8 is selected between the outputs from the automatic exposure control circuit 1 and the manually operable exposure time input means 13. The manually operable exposure time input means 13 may be comprised of a manually rotatable dial to select a proper exposure time in the form of a level of a voltage output to be given to the exposure time signal generating circuit 6 when the latter is comprised of an analog-to-digital converter. Therefore, for instance, a potentiometer is used as the manually operable exposure time input means 13.

Further, in the present invention, a control circuit is connected with the comparator for giving an output to the comparator 8 based on a predetermined condition for flash light photography only when the control circuit receives a flash light emission ready signal. The control circuit is shown at 24 in the drawing and is connected with the digital comparator 8 by way of the decoder 7 and a group of AND gates 25a to 25e interposed between the decoder 7 and the exposure time signal generating circuit 6. The control circuit 24 is actually an inverter which transmits an output from a transistor 23 to the group of AND circuits 25a to 25e. The control circuit 24 operates to inhibit the transmission of the signal from the manually operable exposure time input means 13 or the automatic exposure control circuit 1 to the decoder 7 when an electronic flash light device 14 is attached to the camera and the flash light device 14 is in the ready condition to emit flash light, and give a signal indicative of a predetermined exposure time desirable for the flash light photography, e.g. 1/60 sec.

The electronic flash light device 14 is comprised of a switch 15 connected with a power supply 16, a booster 17 connected with the power supply 16, a flash light discharge tube 18 charged by the booster 17, a main capacitor 19 connected with the flash light tube 18 to energize the tube 18, a trigger circuit 20 connected with the discharge tube 18 operated in synchronization with start of the leading shutter blind of the camera for causing the discharge tube 18 to emit light, and a neon lamp 21 connected with the trigger 20 and the main capacitor 19 for detecting the ready state of the flash light tube energizing capacitor 19 and indicating the state. Further, the electronic flash light device 14 includes an FET 22 connected with the neon lamp 21 which is made conductive by the detecting voltage of the neon lamp 21 when the main capacitor 19 is ready for energizing the flash light discharge tube 18. The FET 22 is provided with a transistor 23 which is made non-conductive or turned off when the FET is made conductive. The output of the transistor 23 is therefore made to be High level when the FET 22 is made conductive. The output of the transistor 23 is connected with said inverter 24.

Accordingly, the output of the inverter 24 is kept to be of High level until the electronic flash light device 14 is ready for emitting light and is turned into Low level when it is brought into the state ready for emitting light.

The output of the inverter 24 is input into one of the inputs of AND gates 25a, 25b, 25c, 25d and 25e the other input of which is connected with output terminals 6a, 6b, 6c, 6d and 6e of the exposure time signal generating circuit 6, respectively. The exposure time signal generating circuit 6 has, in this embodiment shown in the drawing, five outputs 6a to 6e for different exposure time control and one output 6st for a predetermined exposure time for flash light photography, e.g. 1/60 sec. The output of 6st is connected with one input of an OR gate 25st the other input of which is connected with the output of the inverter 24. Then, the output of the AND gates 25a to 25e and the OR gate 25st is connected with the input of the decoder 7.

With the above described structure of the exposure control circuit in accordance with the present invention, the exposure time is controlled on basis of a manually selected exposure condition or an automatically controlled exposure condition with regard to the scene brightness when the electronic flash light device attached to the camera is not ready for emitting light even when the flash light device 14 is attached to the camera, because unless the electronic flash light device 14 is ready for emitting light the output of the inverter 24 is in High level. When the flash light device attached to the camera becomes ready for emitting light, the output of the inverter 24 changes from High level to Low level and all the AND gates 25a to 25e are turned off with only the OR gate 25st is turned on. Accordingly, the exposure time is controlled to be of the predetermined length desirable for flash light photography. In this case, upon release of the shutter means in the camera, the trigger 20 is energized to discharge the flash light tube 18 and the gate 10 is opened to start counting pulses from the clock pulse generator 9. Then, when a predetermined time has lapsed since the start of the leading shutter blind, the OR gate 25st which has been open until then is closed and the digital comparator 8 operates to generate a signal to terminate the operation of the coil 12 which has been locking the trailing shutter blind. Thus, the shutter speed or exposure time of the predetermined value is effected together with the emission of the flash light. Until the electronic flash light device 14 becomes ready for emitting light or discharging the flash light tube 18, the inverter 24 prevents the OR gate 25st from operating. Accordingly, until the flash light device 14 becomes ready, the AND gates 25a to 25e are in the operative condition and the exposure time is determined according to one of the outputs from the output terminals 6a to 6e.

I claim:

1. Exposure time control apparatus for a photographic camera of the type provided with an electronic flash light device having means for producing a "ready" signal when said electronic flash light device is in condition to be triggered to emit a flash of light in response to operation of the shutter mechanism of said photographic camera, said exposure time control apparatus comprising light measuring means for measuring the brightness of a scene and for producing a brightness signal representing the measured brightness; means for producing a signal representing the sensitivity of the photographic film in said camera; means for producing a signal representing the stop size selected for said camera; combining means for combining said signals representing measured brightness, film sensitivity and stop size to produce a first exposure signal representing the duration for which the shutter of said camera should remain open to expose said photographic film; manually operable exposure means for producing a second exposure signal; an exposure time signal generating circuit having a plurality of outputs, each adapted to provide a respective control signal, said exposure time signal generating circuit being selectively responsive to said first or second exposure signal to produce said control signal at the one output thereof corresponding to the selected first or second exposure signal; decoder means coupled to said output of said exposure time signal generating circuit to decode the control signal produced at said one output to an exposure time signal; digital timing means responsive to the opening of said shutter for generating a digital timing signal, said digital timing signal being changed periodically; digital comparator means for comparing said digital timing signal to said exposure time signal to release said shutter when said digital timing signal becomes equal to said exposure time signal; and inhibit means responsive to said "ready" signal produced by said electronic flash light device for inhibiting control signals from being supplied to said decoder means except for a control signal representing a predetermined duration for which said shutter should remain open to expose said photographic film to the scene illuminated by said flash of light, whereby said decoder means supplies to said digital comparator means an exposure time signal indicative of said predetermined duration.

2. The apparatus of claim 1 wherein said manually operable exposure means comprises a manually operable potentiometer for producing an output voltage corresponding to a desired exposure time.

3. The apparatus of claim 1 wherein said inhibit means comprises a plurality of gate circuits, each coupled to a respective one of said outputs of said exposure time signal generating circuit, and each being inhibited from supplying a control signal to said decoder means in response to said "ready" signal.

4. The apparatus of claim 3 wherein said inhibit means further comprises an OR gate coupled to a predetermined output of said exposure time signal generating circuit and further coupled to receive said "ready" signal to supply to said decoder means either the control signal produced at said predetermined output or a simulated control signal represented by said "ready" signal.

5. The apparatus of claim 1 wherein said digital timing means comprises clock pulse generating means for generating periodic clock pulses; counting means for counting said clock pulses to produce said digital timing signal representing the number of clock pulses which have been counted; and means responsive to the opening of said shutter for supplying said clock pulses to said counting means.

* * * * *